James Edwin Hooper's

118131  *Tool for packing Valves.*

PATENTED AUG 15 1871

Witnesses:
Wm. V. Hutchinson
Chas. E. Parker

Inventor:
James Edwin Hooper.
by Alban Andrén
his attorneys

UNITED STATES PATENT OFFICE.

JAMES EDWIN HOOPER, OF BOSTON, MASSACHUSETTS.

IMPROVEMENT IN TOOLS FOR PACKING VALVES.

Specification forming part of Letters Patent No. 118,131, dated August 15, 1871.

*To all whom it may concern:*

Be it known that I, JAMES EDWIN HOOPER, of Boston, in the county of Suffolk and State of Massachusetts, have invented a certain new and useful Tool for Packing Valves, of which the following is a specification:

The nature of my invention relates to a simple and durable tool for the purpose of packing the stuffing-boxes on valves, which is done by pressing down the stuffing-box evenly onto the screw-thread, when a common wrench can be used for screwing down the stuffing-box as far as may be desired.

Figure 1:
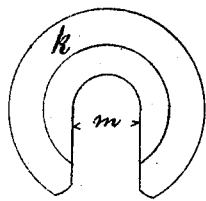
Figure 2:
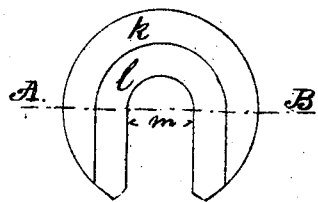
Figure 3:
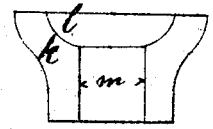
Figure 4:
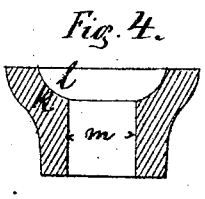

On the drawing, Figure 1 is a bottom view of my packing-tool. Fig. 2 is a top view. Fig. 3 is an end elevation. Fig. 4 is a cross-section over the line A B taken on Fig. 2; and Fig. 5 is a central longitudinal section of a valve with the tool attached, so as to show the use and operation of my invention.

Similar letters refer to similar parts wherever they occur on the drawing.

Figure 5:
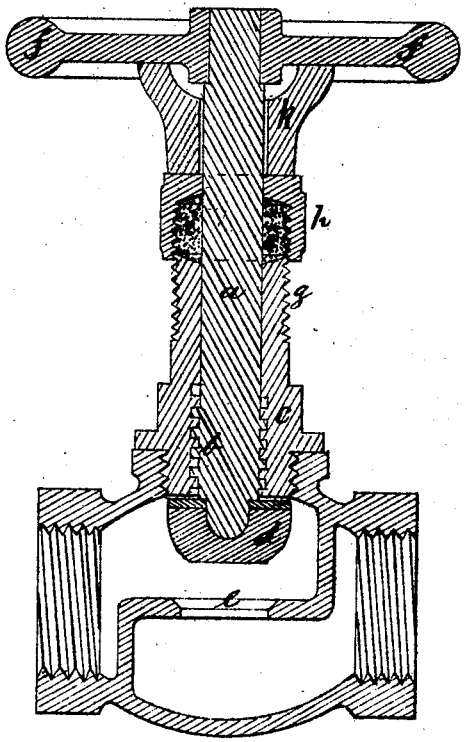

To understand the operation of my invention I will proceed to describe the construction of a common stop-valve, as shown in Fig. 5.

$a$ is the valve-stem, provided with a screw-thread, $b$, in the lower end, that operates in a corresponding nut cut in the upright bearing $c$, as shown. Onto the end of the valve-stem $a$ is attached the valve $d$ in a suitable way. The valve $d$ can be screwed down to rest upon and close the opening $e$ when the valve is to be closed. The valve-stem $a$ is turned by means of a hand-wheel, $f$, attached firmly to the upper end of the said valve-stem. The upper end of the upright bearing $c$ is cut with a screw-thread, $g$, over which the nut $h$ can be screwed. The nut $h$ forms the stuffing-box, and is for this purpose provided with a cavity, into which the packing $i$ is laid.

Formerly it was the custom to press down the stuffing-box $h$ onto the screw-thread $g$ by means of a chisel or metallic bar placed between the under side of the hand-wheel $f$ and the upper end of the nut $h$, and by using this chisel or bar as a lever the nut $h$ was pressed down onto the thread $g$ enough so as to be able to screw down said stuffing-box by means of a common wrench; but the pressure of such a chisel or bar used for that purpose was very uneven on the nut $h$, as it came only on one side of the nut $h$, and it was, therefore, very difficult to get the nut $h$ to screw over the thread $g$. A pressure must always be used on the top of the nut $h$, as the elasticity of the packing $i$ presses the nut $h$ upward when the stuffing-box is packed.

To avoid this difficulty is the purpose of my invention, and I employ, therefore, a split ring, $k$, having a cavity, $l$, in its upper end, as shown. The cavity $l$ is made so that the hub of the hand-wheel $f$ shall not rest upon the split ring, but the arms of the hand-wheel $f$ rest steadily on the upper end of said ring $k$, as shown in Fig. 5. The width of the opening $m$ in this packing-tool is made large enough so as to be useful for more than one size of a valve-stem.

When it is desired to pack the stuffing-box $h$ I place the packing $i$ in the cavity in the nut $h$ and screw up the valve-stem $a$, and with it the hand-wheel $f$, enough so as to slip the ring $k$ easily around the valve-stem between the under side of the hand-wheel $f$ and upper end of the stuffing-box $h$; and by screwing down the valve-stem $a$, by means of turning the hand-wheel $f$, I press the packing-tool $k$ and the nut or stuffing-box $h$ evenly downward till an engagement between the screw-threads of the nut $h$ and upright bearing $g$ takes place, when the nut or stuffing-box $h$ can easily be turned downward by means of a common screw-wrench, as usual, thus saving a great deal of time and annoyance usually experienced by mechanics in packing valves.

Having thus fully described the nature, construction, and operation of my invention, I wish to secure by Letters Patent, and claim—

In combination with a stop-valve, the ring $k$, having a slit or opening on one side, acting conjointly with the spindle and hand-wheel of the valve, as a device for packing valves, in a manner as shown and described.

JAMES EDWIN HOOPER.

Witnesses:
WM. W. HUTCHINSON,
ALBAN ANDRÉN.